US007667691B2

(12) United States Patent
Boss et al.

(10) Patent No.: US 7,667,691 B2
(45) Date of Patent: Feb. 23, 2010

(54) SYSTEM, COMPUTER PROGRAM PRODUCT AND METHOD OF PREVENTING RECORDATION OF TRUE KEYBOARD ACOUSTIC EMANATIONS

(75) Inventors: Gregory Jensen Boss, American Fork, UT (US); Peter George Finn, Brampton (CA); Rick Allen Hamilton, II, Charlottesville, VA (US); John Steven Langford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 11/335,492

(22) Filed: Jan. 19, 2006

(65) Prior Publication Data

US 2007/0165001 A1 Jul. 19, 2007

(51) Int. Cl.
*G06F 3/02* (2006.01)

(52) U.S. Cl. ...................................... 345/168

(58) Field of Classification Search ............. 345/168, 345/172; 715/702, 772; 400/86–87; 381/171.1
See application file for complete search history.

(56) References Cited

U.S. PATENT DOCUMENTS

| 6,798,887 | B1* | 9/2004 | Andre ................. 381/73.1 |
| 2003/0078515 | A1* | 4/2003 | Menzel et al. ............ 600/559 |
| 2007/0140504 | A1* | 6/2007 | Tribble et al. ............ 381/73.1 |

OTHER PUBLICATIONS

Keyboard Acoustic Emanations, Asonov and Agrawal, IBM Almaden Research Center.
Keyboard Acoustic Emanations Revisited, Zhuang, Zhou and Tyler, University of California, Berkeley.
Acoustic Spying Decodes Typists' Tapping, ABC News Online, Sep. 15, 2005.

* cited by examiner

*Primary Examiner*—Regina Liang
*Assistant Examiner*—Shaheda A Abdin
(74) *Attorney, Agent, or Firm*—Joseph C. Redmond, Jr.; William H. Steinberg

(57) ABSTRACT

A system, computer program product and method of preventing recordation of true keyboard acoustic emanations are provided. In an embodiment, it is determined whether a user has stricken a key on a keyboard. In response to the stricken key a keystroke sound from a mask which is dissimilar to a keystroke sound produced by the stricken key is emitted to drown out the keystroke sound of the stricken key. In another embodiment, when a plurality of keys is stricken, a random keystroke sound is emitted between keystroke sounds made by two stricken keys to blur out word boundaries.

20 Claims, 7 Drawing Sheets

SYSTEM, COMPUTER PROGRAM PRODUCT AND METHOD OF PREVENTING RECORDATION OF TRUE KEYBOARD ACOUSTIC EMANATIONS

BACKGROUND OF THE INVENTION

1. Technical Field

The present invention is directed generally to computer security. More specifically, the present invention is directed to a system, computer program product and method of preventing recordation of true keyboard acoustic emanations.

2. Description of Related Art

There is a plurality of methods for extracting information from supposedly secure computing systems. These methods involve side-channel attacks. Side-channel attacks use crypto-analytic techniques that rely on information unintentionally leaked by computing devices. For example, electromagnetic emanations, power consumption, diffuse visible light from CRT displays and acoustic emanations of CPU activity have all been used with crypto-analytic techniques to glean information from computer systems.

Another source that may be used to extract information from computing systems is acoustic emanations from keyboards. It has been shown recently that if one has a long enough audio recording (e.g., 10 minutes of recording) of some one typing on an ordinary computer keyboard, the text typed can be recovered. The premise is that different keys tend to make slightly different sounds. Although one may not know in advance which keys make which sounds, using machine learning and a long enough sample of someone typing on a keyboard, one can figure out which keys make which sounds. Once done the typed text may be recovered. This side-channel attack is discussed in KEYBOARD ACOUSTIC EMANATIONS, by Asonov and Agrawal, IBM Almaden Research Center and in KEYBOARD ACOUSTIC EMANATIONS REVISITED, by Zhuang, Zhou and Tygar, University of California at Berkeley. See also an ABC news article at http://www.abc.net.au/news/newsitems/200509/s1460695.htm. Both references as well as a copy of the news article are disclosed in an Information Disclosure Statement filed concurrently with the present application.

Thus, what is needed is a system, computer program product and method of preventing recordation of true keyboard acoustic emanations.

SUMMARY OF THE INVENTION

The present invention provides a system, computer program product and method of preventing recordation of true keyboard acoustic emanations. In a particular embodiment, it is determined whether a user has stricken a key on a keyboard. As mentioned before, each stricken key produces a unique keystroke sound, which is why a typed in text may be reproduced from a recordation of keystroke sounds of keys stricken when the text was being typed into a computer system. In response to the stricken key, a keystroke sound from a mask and which is dissimilar to the produced keystroke sound of the stricken key is emitted to drown out the keystroke sound of the stricken key. The emitted keystroke sound may be recorded. After the text is entered into the computer system (by striking a plurality of keys), the text is reconstructed using the recorded emitted keystroke sounds for comparison with the text typed in by the user. If, based on the comparison, there is a high degree of similarity between the reconstructed text and the text typed in by the user, the mask is modified to emit a different keystroke sound, which is also dissimilar to a produced keystroke sound of a stricken key, when the key is stricken.

In another embodiment, when a text is being entered into the computer system by striking a plurality of keys, a random keystroke sound is emitted between some of the keystroke sounds made by two stricken keys. The random keystroke sounds are emitted at different intervals of time. Note that, the random keystroke sound emitted is a keystroke sound of a key representing one of a plurality of most often used characters in a language in which the typed in text is written. Further, white noise may be added to the keystroke sounds to make text recovery even more difficult.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method of passively and/or actively masking audio sound generated by keys of a keyboard. As described in the above-disclosed references, each depression and each release of a given key on a keyboard generate an audible sound that is generally unique to that key. This is the characteristic of a keyboard that is used to recover text typed on a computer system. If a false or a masking sound can be generated at each depression and release of a key (i.e., at each keystroke), then keyboard eavesdropping may be successfully thwarted.

Figure 1A:
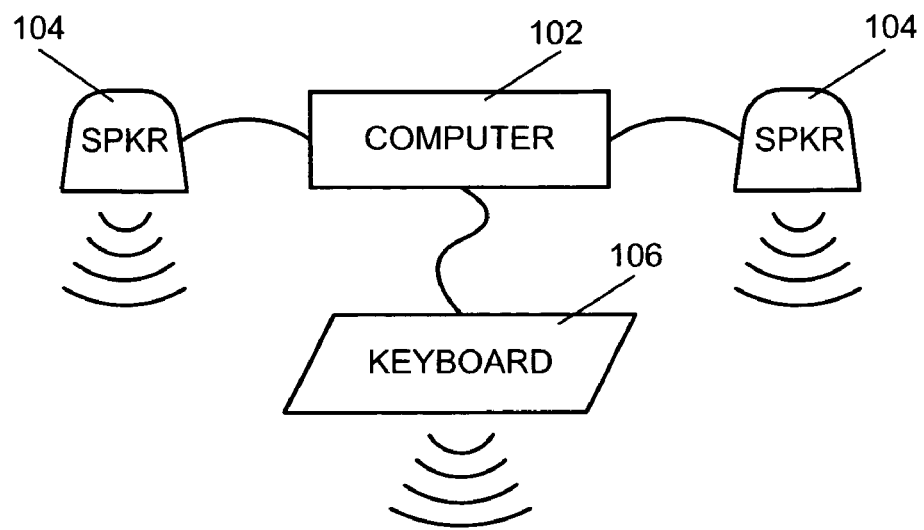
FIG. 1a illustrates a first computer system into which the present invention may be implemented.

With reference now to the figures in which like reference numerals identify like elements, FIG. 1a illustrates a computer system into which the present invention may be implemented. The computer system includes a computer box 102, a pair of speakers 104 and a keyboard 106. When a key of the keyboard 106 is depressed and/or released, one or more randomly selected keyboard sounds may be generated. The generated sounds may be mechanically or software induced and may emanate either from the speakers 104 or from the keyboard 106.

Figure 2:
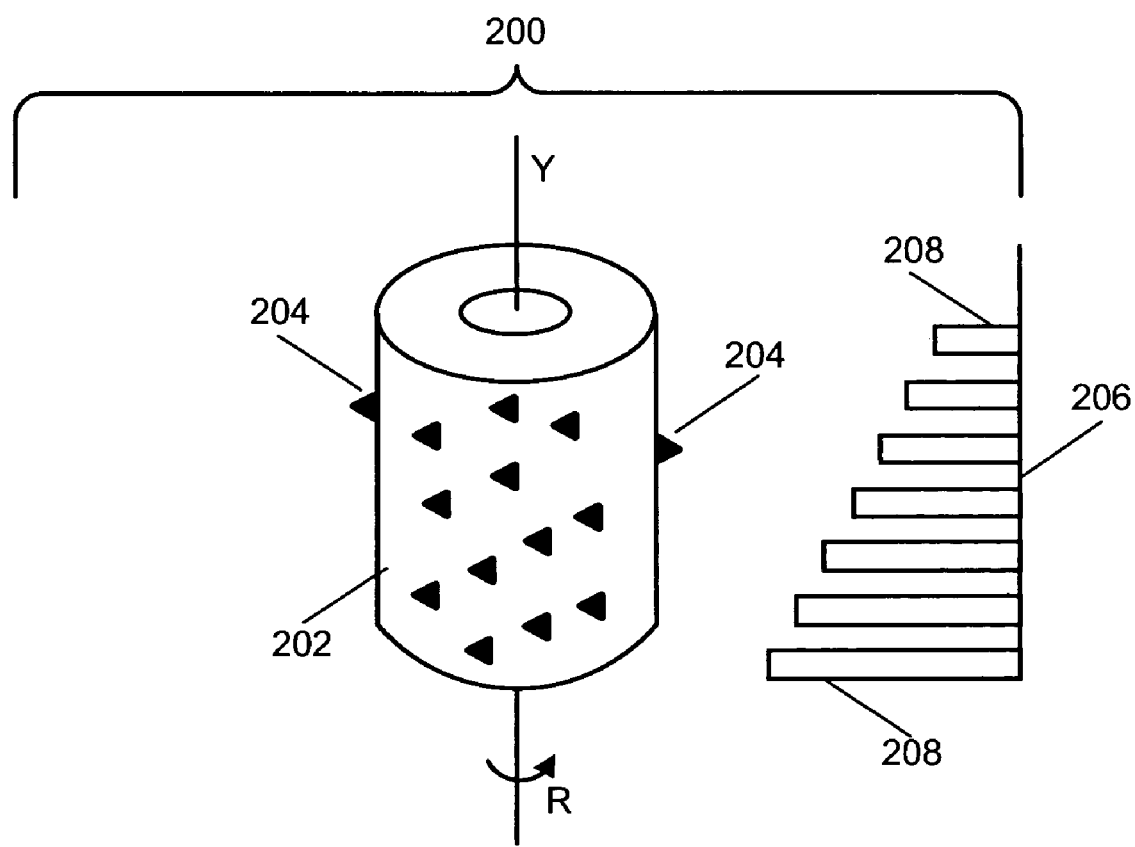
FIG. 2 depicts a representative cylinder spool which may be used by the invention.

The mechanically induced sound may be generated by a cylinder spool with protrusions akin to cylinder spools used in music boxes. A representative cylinder spool 200 is shown in FIG. 2. In FIG. 2 are depicted a cylinder 202 with a plurality of protrusions 204 and a comb 206 with a plurality of teeth 208. Each time a key is depressed or released, the cylinder 202 may rotate a specific distance R on axis Y such that one of the protrusions 204 pushes and releases one of the teeth 208. The (pushed and released) tooth 208 will then produce a sound that resembles a depressed or released key of the keyboard 106. Specifically, each tooth 208 may be of a different length. The length of a tooth (as well as the material used to make the comb) may be chosen to induce the tooth to emit a sound that resembles a depressed and/or released key of keyboard 106. After each 360° rotation of the cylinder 202, the different mechanically induced sounds will be repeated to effectively mask the true sounds of the keys of keyboard 106.

As mentioned before, the sound may be emitted by the keyboard 106. In such a case, the cylinder spool 200 may reside in keyboard 106. Alternatively, the cylinder spool 200 may reside in computer 102. Further, the sound emanated from the cylinder spool 200 may be processed by computer 102 and emitted through speakers 104.

If the sound is induced by software, an algorithm may be used such that keystroke sounds are randomly produced. Software on the computer 102 may detect keystrokes on a keyboard in near real-time and responds by echoing out one or more randomly chosen, pre-recorded sounds through speakers 104. Thus, the mechanical sounds made by the keyboard may be drowned out by the masking sound from the speakers.

Further, occasional (or perhaps random) keystroke sounds may also be interspersed to hide word boundaries. That is, random characters may be inserted into acoustically-intercepted text streams. Note that although these characters may be random in nature, they may also be tuned to the most commonly used characters in a given language (e.g., e, s, t, etc. in the English language). The use of such tuned characters may make statistical interpretation of the masked characters more difficult to achieve. To make interpretation of the masked characters even more difficult to achieve, white noise may be used to enhance the masking sound.

Figure 1B:
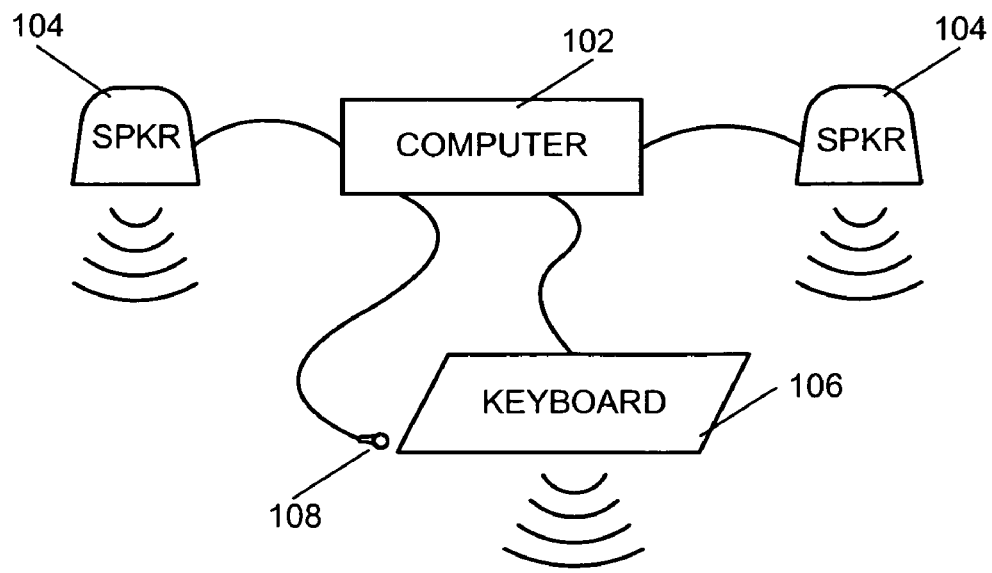
FIG. 1b illustrates a second computer system into which the present invention may be implemented.

In addition, a learning variant designed to improve audible accuracy of the masking sound may also be used. In this case, a computer system such as the one in FIG. 1b may be used. With the exception of microphone 108, FIG. 1b is identical to FIG. 1a. The microphone 108 may be used to record keystroke sounds. Specifically, before the invention is used, a user may have to use each particular key on the keyboard to allow the computer to map an actual keystroke sound to a corresponding key.

The microphone 108 may be placed in close proximity to the keyboard 106. This allows the computer 102 to "hear" the keystroke sounds while a text is being typed. The computer 102 may then use the same algorithm used to reconstruct a text from recorded sounds of a keyboard to try to reconstruct the typed text. The reconstructed text may then be compared with the actual typed text. Based on the comparison, the software may modify the masking sound by generating a different masking sound when a particular key is depressed/released and also, if required, play random key sounds during periods of keyboard inactivity. Thus, the computer 102 may be in a continuous learning mode.

Further, the microphone 108 and/or speakers 104 may be integrated into keyboard 106. This would enable the computer 102 to more precisely mimic and mask keystroke sounds. It would also prevent the successful use of super-directional microphones by having the masking sound emanate from the same physical place as the sound of the keystrokes.

Figure 3:
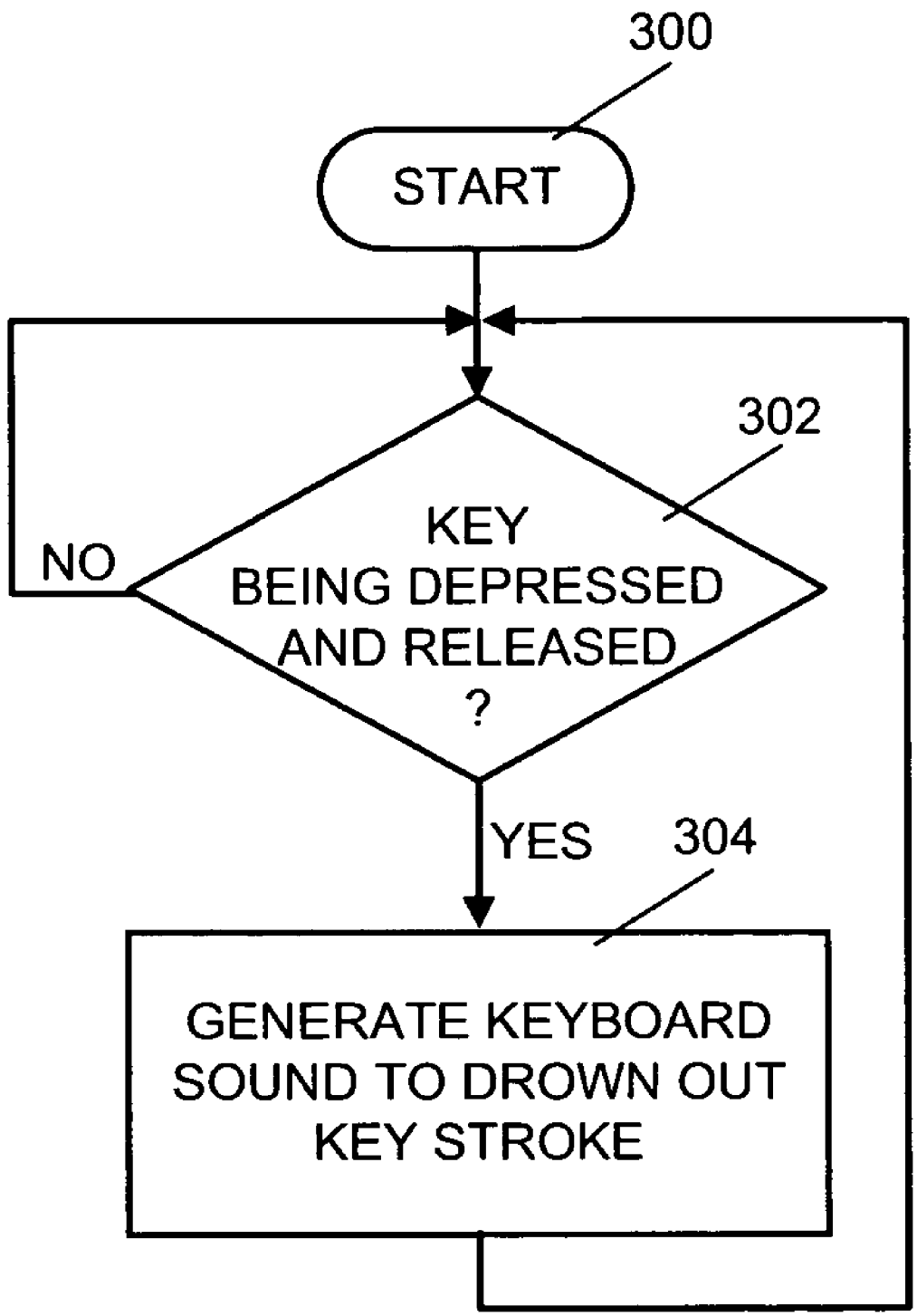
FIG. 3 is a flow diagram of a first process that may be used to implement the invention.

FIG. 3 is a flow diagram of a first process that may be used to implement the invention. The process starts when the computer system is turned on or is reset (step 300). A check is then continuously being made to determine whether a user is typing (step 302). If so, a masking sound is generated to drown out real keystroke sounds made by the keyboard 106 (step 304) before the process returns to step 302.

Figure 4:
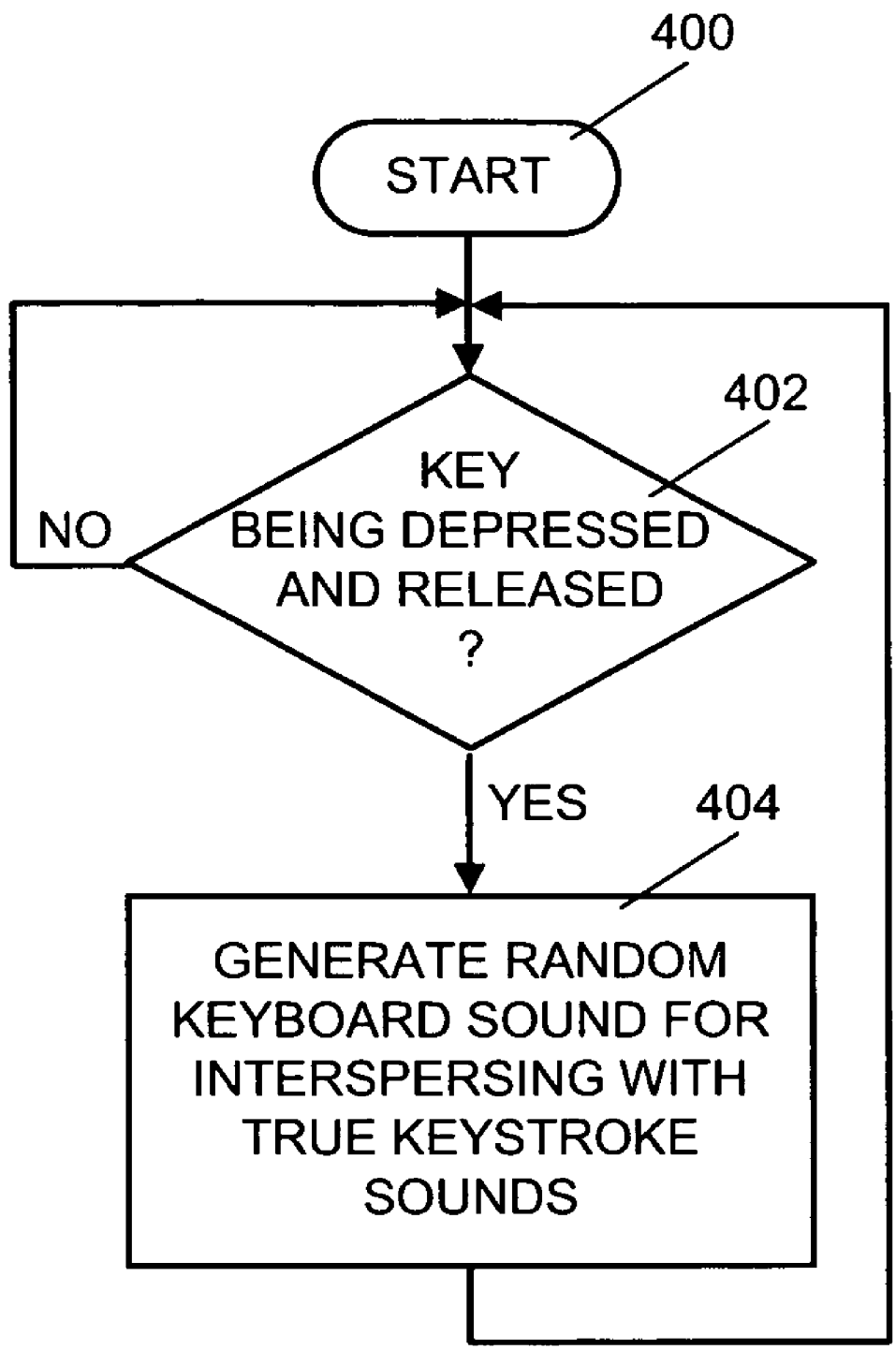
FIG. 4 is a flow diagram of a second process that may be used to implement the invention.

FIG. 4 is a flow diagram of a second process that may be used to implement the invention. The process starts when the computer system is turned on or is reset (step 400). A check is then continuously being made to determine whether a user is typing (step 402). If so, random keystroke sounds are generated and interspersed in the stream of true keystroke sounds to hide out word boundaries etc. (step 404). As mentioned before, the random keystroke sounds may be tuned to the most commonly used characters in a given language such as e, s, t, etc. in the English language. The process may then return to step 402.

Figure 5:
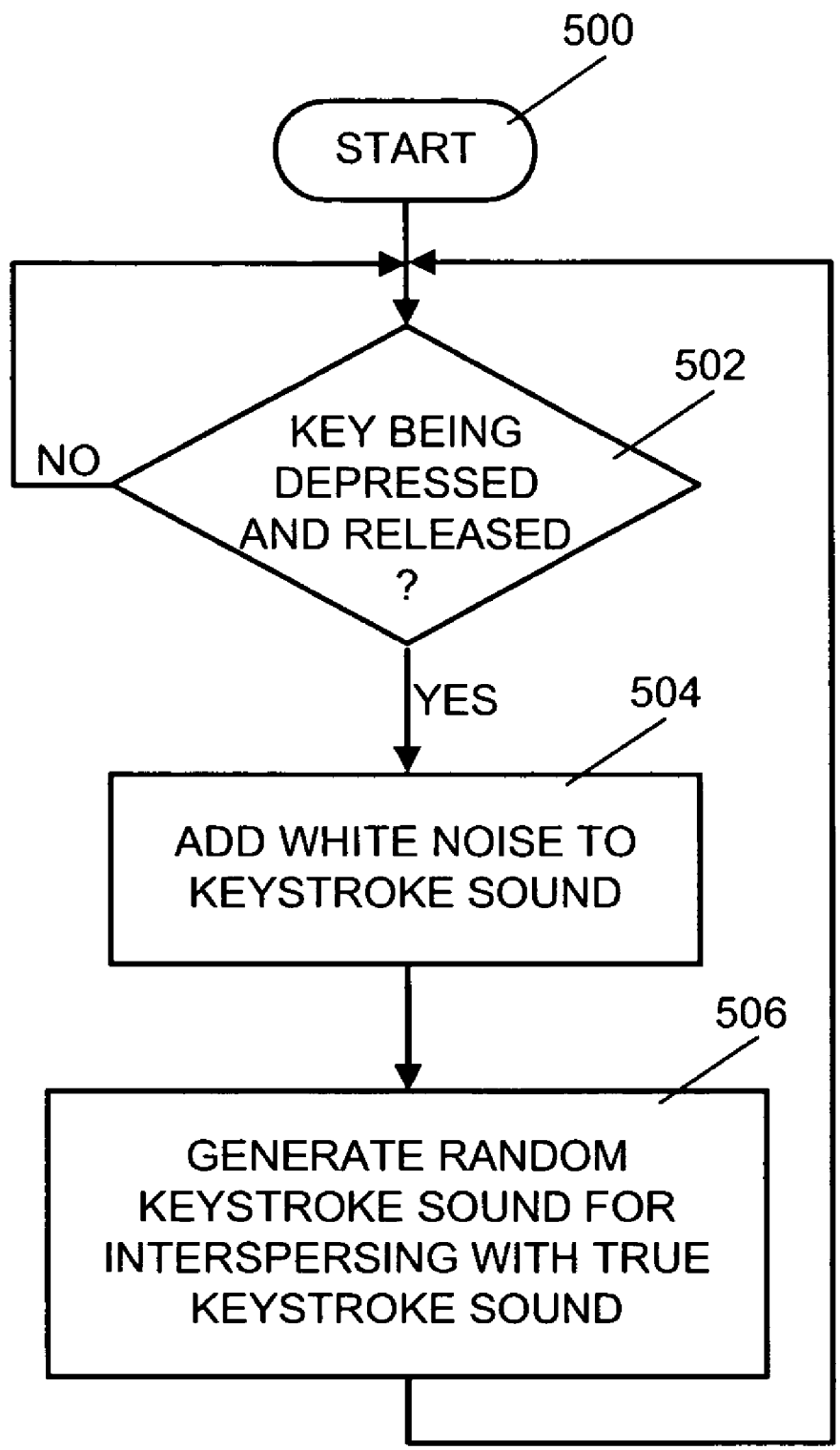
FIG. 5 is a flow diagram of a third process that may be used to implement the invention.

FIG. 5 is a flow diagram of a third process that may be used to implement the invention. The process starts when the computer system is turned on or is reset (step 500). A check is then continuously being made to determine whether a user is typing (step 502). If so, white noise is added to keystroke sounds (step 504). In addition, random keystroke sounds are generated and interspersed in the stream of true keystroke sounds (step 506). Then the process returns to step 502.

Figure 6:
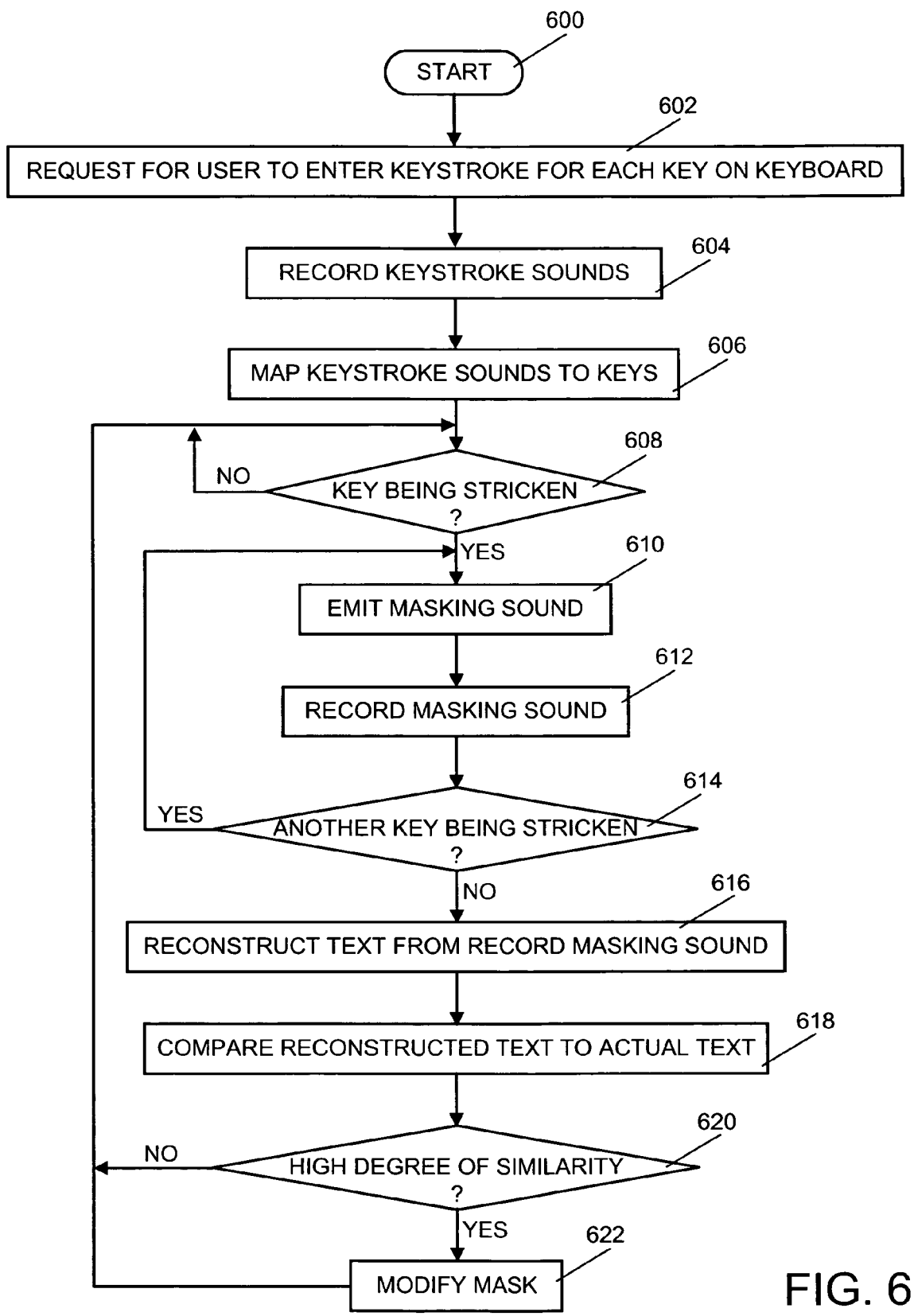
FIG. 6 is a flow diagram of a fourth process that may be used to implement the invention.

FIG. 6 is a flow diagram of a fourth process that may be used to implement the invention. The process starts when the computer system is turned on or is reset (step 600). Here steps 602, 604 and 606 are only done once (i.e., the first time the invention is used). In step 602, a user may be requested to type in each character on keyboard 106 in a certain order. The keystroke sound for each character will be recorded (step 604) and mapped to the keys of the keyboard 106 (step 606). Once this is done, the process will continuously check to see whether a user is typing a text or entering characters by striking keys on keyboard 106 (step 608). If so, a pre-recorded (either at the factory or in the field) masking sound will be emitted to drown out the real keystroke sound (step 610). The emitted sound will be recorded (step 612). When a text has been typed in (i.e., when no more keys are being stricken see step 614) then the invention will reconstruct the text that was typed by using any one of the crypto-analytic techniques used to extract information from a computer system through recorded keystroke sounds (step 616). The reconstructed text will be compared to the actual text that was typed in (step 618). The actual text may be taken from the buffer into which it is stored so that it can be displayed on the screen or from the actual keys stricken. If there is a high degree of similarity (e.g., more than 10 percent of the words typed in are the same as the words in the reconstructed text) as exhibited by a "YES" answer from decision box 620, then the pre-recorded mask used to produce the masking sound may be modified (step 622) before the process returns to step 606. If there is not a high degree of similarity then the process returns directly to step 606.

Figure 7:
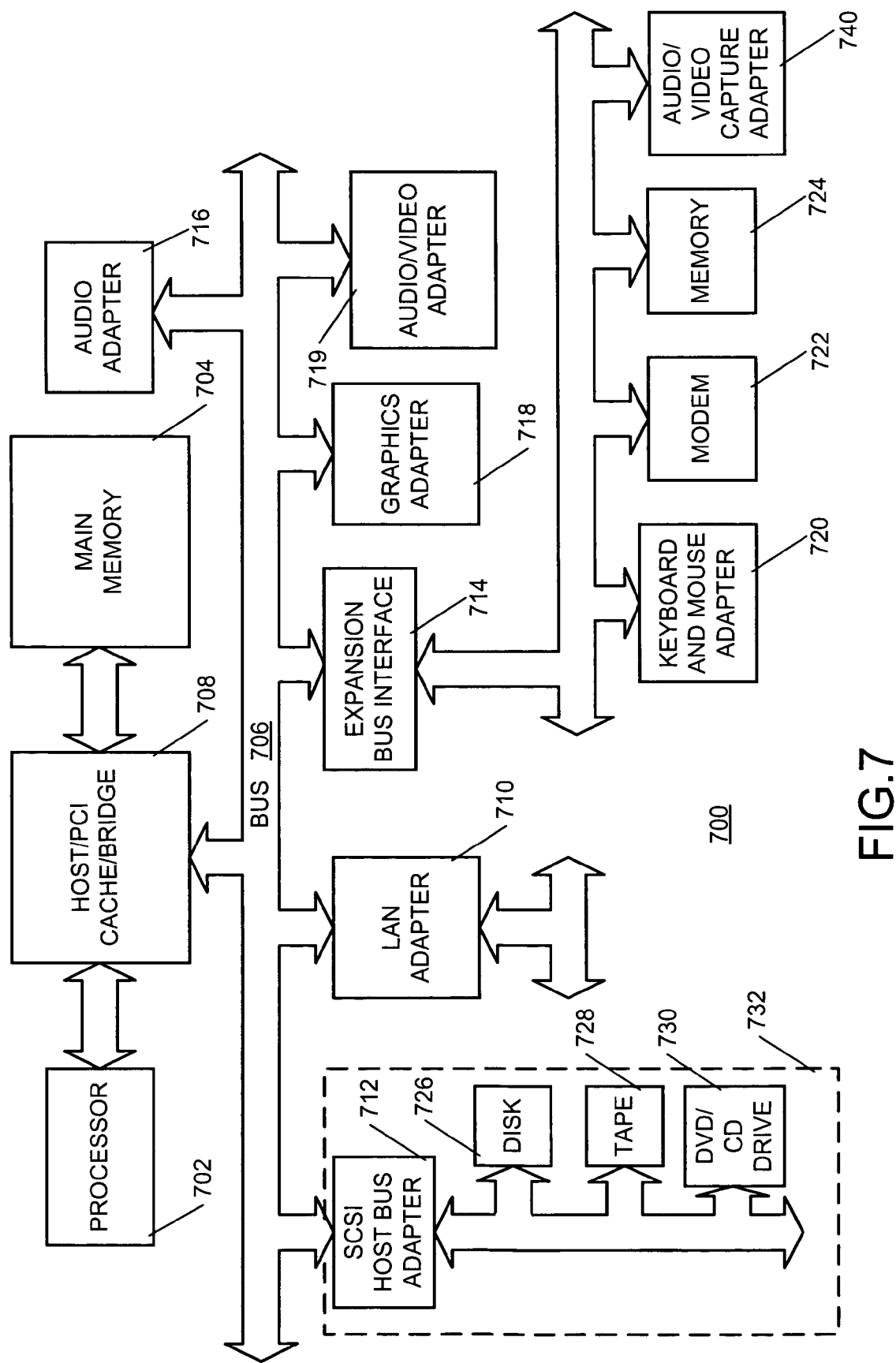
FIG. 7 is a detailed block diagram of a computer system in which the present invention may be used.

FIG. 7 is a more detailed block diagram 700 of the computer system in FIGS. 1a and 1b. The block diagram 700 includes a peripheral component interconnect (PCI) local bus architecture. Although the depicted example employs a PCI bus, other bus architectures such as Accelerated Graphics Port (AGP) and Industry Standard Architecture (ISA) may be used. Processor 702 and main memory 704 are connected to PCI local bus 706 through PCI bridge 708. PCI bridge 708 also may include an integrated memory controller and cache memory for processor 702. Additional connections to PCI local bus 706 may be made through direct component interconnection or through add-in boards. In the depicted example, local area network (LAN) adapter 710, SCSI host bus adapter 712, and expansion bus interface 714 are connected to PCI local bus 706 by direct component connection. In contrast, audio adapter 716, graphics adapter 718, and audio/video adapter 719 are connected to PCI local bus 706 by add-in boards inserted into expansion slots. Expansion bus interface 714 provides a connection for a keyboard and mouse adapter 720, modem 722, additional memory 724 and an audio/video capture adapter 740. Small computer system interface (SCSI) host bus adapter 712 provides a connection for hard disk drive 726, tape drive 728, and CD/DVD-Drive 730. Typical PCI local bus implementations will support three or four PCI expansion slots or add-in connectors.

An operating system runs on processor 702 and is used to coordinate and provide control of various components within the block diagram 700 in FIG. 7. The operating system may be a commercially available operating system, such as Windows XP, which is available from Microsoft Corporation or AIX, which available from Internal Business Machines Corp. An object oriented programming system such as Java may run in conjunction with the operating system and provide calls to the operating system from Java programs or applications executing on the computer system. "Java" is a trademark of Sun Microsystems, Inc. Instructions for the operating system, the object-oriented operating system, and applications or programs are located on storage devices, such as hard disk drive 726, and may be loaded into main memory 704 for execution by processor 702.

Those of ordinary skill in the art will appreciate that the hardware in FIG. 7 may vary depending on the implementation. Other internal hardware or computer readable medium, such as flash ROM (or equivalent nonvolatile memory) or optical disk drives and the like, may be used in addition to or in place of the hardware depicted in FIG. 7. Also, the processes of the present invention may be applied to a multiprocessor data processing system.

The depicted example in FIG. 7 and above-described examples are not meant to imply architectural limitations. For example, the block diagram 700 may also be a notebook computer or hand held computer as well as a kiosk or a Web appliance.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of preventing recordation of true keyboard acoustic emanations comprising the steps of:
   determining whether a user has stricken a key on a keyboard, the stricken key producing a keystroke sound;
   generating a randomly selected keystroke sound dissimilar and unique to the produced keystroke sound via a mask;
   emitting the generated randomly selected keystroke sound such that the produced keystroke sound is drown out by the generated keystroke sound, and
   modifying the mask in the event of similarity between the produced key stroke sound and the generated randomly selected key stroke sound.

2. The method of claim 1 wherein the emitted keystroke sound is recorded.

3. The method of claim 2 wherein a user types in a text by striking a plurality of keys, each stricken key producing a keystroke sound that is drown out by an emitted keystroke sound dissimilar to the produced keystroke sound and which is recorded, the keystroke sound dissimilar to the keystroke sound made by the stricken keys being generated from a mask, after the text is typed in, the text is reconstructed using the recorded emitted keystroke sounds for comparison with the text typed in by the user.

4. The method of claim 3 wherein if, based on the comparison, there is a high degree of similarity between the reconstructed text and the text typed in by the user, the mask is modified to emit a different keystroke sound, which is dissimilar to a produced keystroke sound of a stricken key, when the key is stricken.

5. The method of claim 1 wherein a user types in a text by striking a plurality of keys, each stricken key producing a keystroke sound, the method further comprising the step of emitting a random keystroke sound between keystroke sounds made by two stricken keys at different intervals of time instead of generating a keystroke sound dissimilar to the produced keystroke sound for drowning out the keystroke sound of a stricken key.

6. The method of claim 5 wherein the random keystroke sound emitted is a keystroke sound of a key representing one of a plurality of most often used characters in a language, the language being the language in which the typed in text is written.

7. The method of claim 6 wherein white noise is added to keystroke sounds.

8. A computer program product on a computer readable medium for preventing recordation of true keyboard acoustic emanations comprising:
   code means for determining whether a user has stricken a key on a keyboard, the stricken key producing a keystroke sound;
   code means for generating a randomly selected keystroke sound dissimilar and different to the produced keystroke sound via a mask;
   code means for emitting the generated randomly selected keystroke sound such that the produced keystroke sound is drown out by the generated randomly selected keystroke sound, and modifying the mask in the event of similarity between the produced key stroke sound and the generated randomly selected key stroke sound.

9. The computer program product of claim 8 wherein the emitted keystroke sound is recorded.

10. The computer program product of claim 9 wherein a user types in a text by striking a plurality of keys, each stricken key producing a keystroke sound that is drown out by an emitted keystroke sound dissimilar to the produced keystroke sound and which is recorded, the keystroke sound dissimilar to the keystroke sound made by the stricken keys being generated from a mask, after the text is typed in, the text is reconstructed using the recorded emitted keystroke sounds for comparison with the text typed in by the user.

11. The computer program product of claim 10 wherein if, based on the comparison, there is a high degree of similarity between the reconstructed text and the text typed in by the user, the mask is modified to emit a different keystroke sound, which is dissimilar to a produced keystroke sound of a stricken key, when the key is stricken.

12. The computer program product of claim 8 wherein a user types in a text by striking a plurality of keys, each stricken key producing a keystroke sound, the computer program product further comprising code means for emitting a random keystroke sound between keystroke sounds made by two stricken keys at different intervals of time instead of generating a keystroke sound dissimilar to the produced keystroke sound for drowning out the keystroke sound of a stricken key.

13. The computer program product of claim 12 wherein the random keystroke sound emitted is a keystroke sound of a key representing one of a plurality of most often used characters in a language, the language being the language in which the typed in text is written.

14. The computer program product of claim 13 wherein white noise is added to keystroke sounds.

15. A computer system for preventing recordation of true keyboard acoustic emanations, the computer system having a keyboard for entering characters into the computer system, the computer system comprising:
   at least one storage device for storing all code data for masking purposes; and
   at least one processor for processing the code data to determine whether a user has stricken a key on the keyboard, the stricken key producing a keystroke sound via a pre-recorded mask, to generate a randomly selected keystroke sound dissimilar to the produced keystroke sound, and to emit the generated randomly selected keystroke sound such that the produced keystroke sound is drown out by the generated random selected keystroke sound and modifying the mask in the event of similarity between the produced key stroke sound and the generated randomly selected key stroke sound.

16. The computer system of claim 15 wherein the emitted keystroke sound is recorded.

17. The computer system of claim 16 wherein a user types in a text by striking a plurality of keys, each stricken key producing a keystroke sound that is drown out by an emitted randomly selected keystroke sound dissimilar to the produced keystroke sound and which is recorded, the randomly selected keystroke sound dissimilar to the keystroke sound made by the stricken keys being generated from a mask, after the text is typed in, the text is reconstructed using the recorded emitted randomly selected keystroke sounds for comparison with the text typed in by the user.

18. The computer system of claim 17 wherein if, based on the comparison, there is a high degree of similarity between the reconstructed text and the text typed in by the user, the mask is modified to emit a different randomly selected keystroke sound, which is dissimilar to a produced keystroke sound of a stricken key, when the key is stricken.

19. The method of claim 15 wherein a user types in a text by striking a plurality of keys, each stricken key producing a keystroke sound, the code data is processed to emit a random keystroke sound between keystroke sounds made by two stricken keys at different intervals of time instead of to generate a keystroke sound dissimilar to the produced keystroke sound for drowning out the keystroke sound of a stricken key.

20. The computer system of claim 19 wherein white noise is added to keystroke sounds and the random keystroke sound emitted is a keystroke sound of a key representing one of a plurality of most often used characters in a language, the language being the language in which the typed in text is written.

* * * * *

UNITED STATES PATENT AND TRADEMARK OFFICE
CERTIFICATE OF CORRECTION

PATENT NO.      : 7,667,691 B2                                            Page 1 of 1
APPLICATION NO. : 11/335492
DATED           : February 23, 2010
INVENTOR(S)     : Boss et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1072 days.

Signed and Sealed this

Seventh Day of December, 2010

David J. Kappos
*Director of the United States Patent and Trademark Office*